United States Patent Office 3,770,632
Patented Nov. 6, 1973

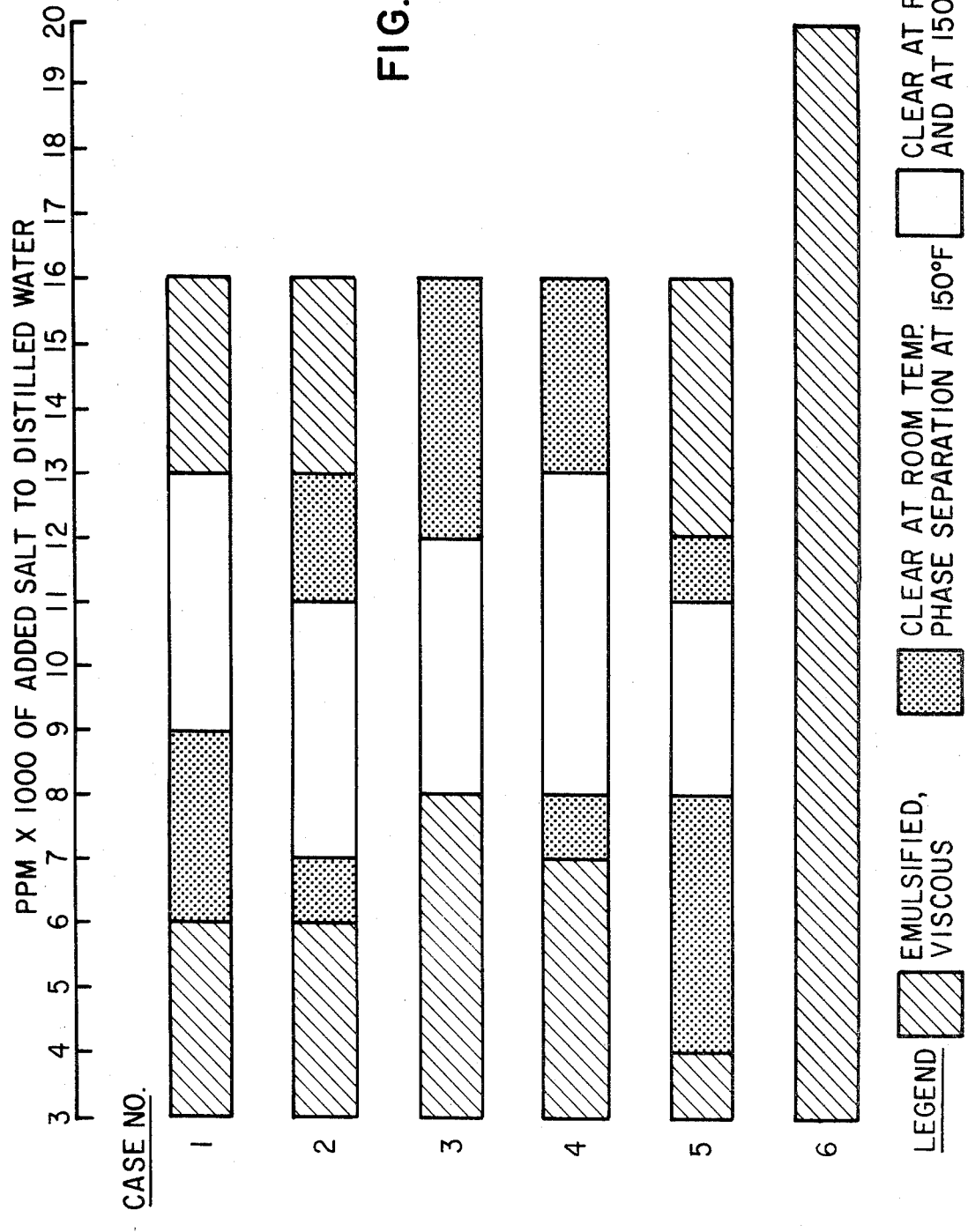

3,770,632
MICELLAR FLUIDS FOR INJECTION WELL STIMULATION AND OIL RECOVERY
James D. Gilliam and Dwight L. Dauben, Tulsa, Okla., assignors to Amoco Production Company, Tulsa, Okla.
Continuation-in-part of abandoned application Ser. No. 38,366, May 18, 1970. This application Mar. 6, 1972, Ser. No. 231,850
Int. Cl. B01j 13/00; E21b 43/20
U.S. Cl. 252—8.55 D                    10 Claims

ABSTRACT OF THE DISCLOSURE

Micellar solutions highly stable to a wide range of temperatures, high shear rates through an orifice and salt concentrations up to about 15,000 p.p.m. are prepared from a hydrocarbon oil, a surfactant, and a cosurfactant, the latter being composed of an ethylene oxide adduct of a preferentially oil-soluble primary alcohol and a $C_4$ to $C_6$ alcohol. In cases of high water content solutions, i.e., 90–95% water, the hydrocarbon may be omitted.

Figure 1:
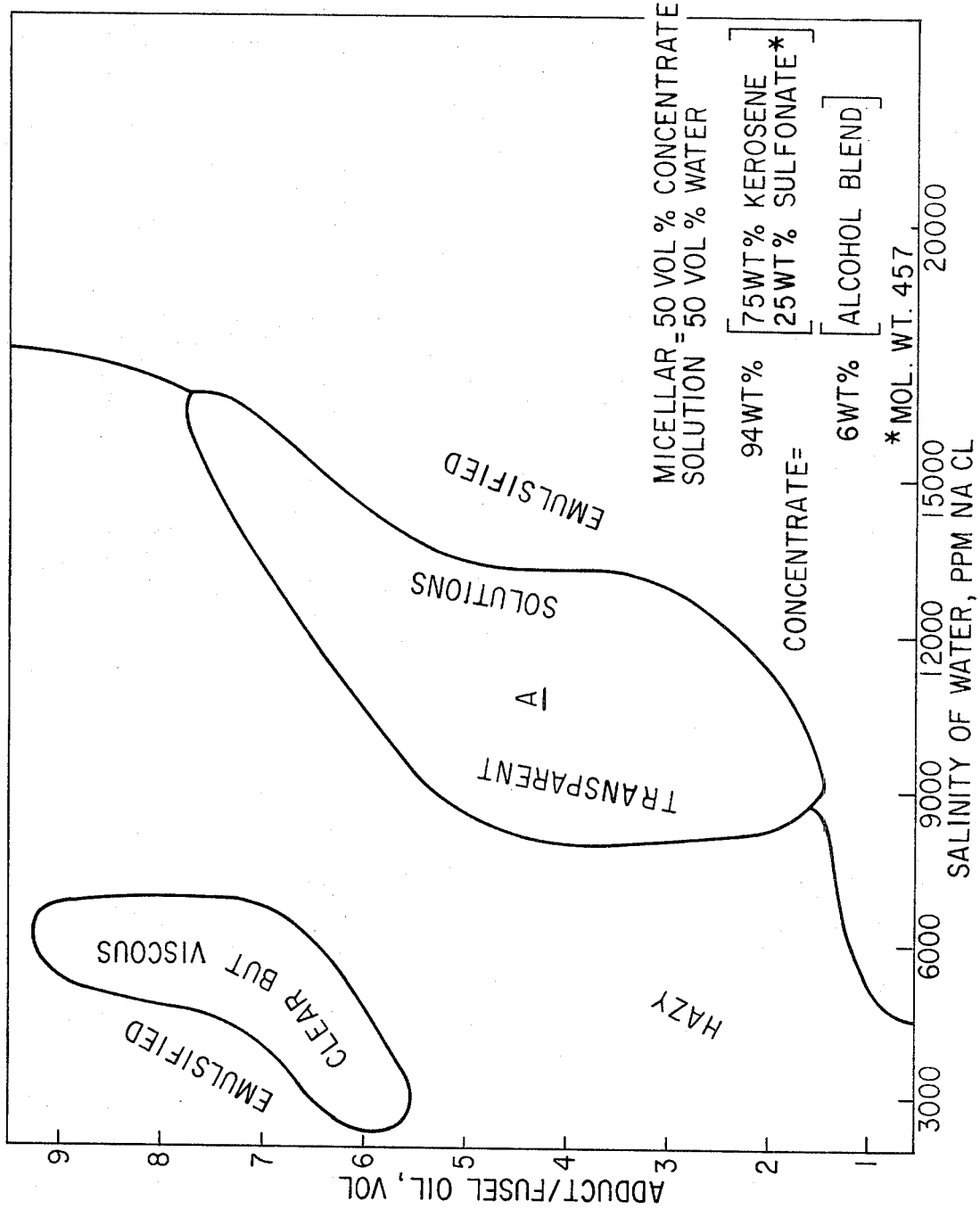

This is a continuation-in-part of our application U.S. Ser. No. 38,366, filed May 18, 1970, now abandoned.

INTRODUCTION

The present invention relates to new and useful compositions of matter. In particular, it is concerned with solubilized oil-water or micellar solutions produced from a petroleum sulfonate, a cosurfactant, and water in the presence or absence of suitable hydrocarbons. We have found that such solutions can remain essentially homogeneous and stable even at high concentrations of water, e.g., about 90% by weight. These fluids can be employed to increase the permeability of water injection wells and for oil recovery operations such as miscible flooding.

BACKGROUND OF THE INVENTION

Solubilized oil-water systems have previously been used to increase the injection capacity of water injection wells and as a type of solvent slug in miscible flooding operations to recover oil from an underground reservoir. Such oil-water systems, however, possess a number of disadvantages. For example, in U.S. 3,467,188 the oil-external micellar solutions described and claimed therein have a number of practical disadvantages. They are unstable at temperatures below about 50° F. and above about 115° F. This tends to rule out or render difficult their use in the field during extreme temperature conditions which are frequently encountered in actual operations. Also, these solutions are shear-sensitive and tend to separate when circulated at high rates through an orifice, for example, to raise the temperature to a level at which they become homogeneous.

The injectivity of water injection wells can be improved by the use of processes capable of removing residual oil saturation and/or organic deposits from around the well bore. Restrictions in injectivity occur in formations in which the permeability to water at residual oil saturation is a small percentage of the permeability at 100% water saturation. These percentages normally range from 5–15% for water-wet formations, 15–30% for intermediate-water formations and 30–80% for oil-wet formations. Based upon radial flow calculations, two fold injectivity improvements can be obtained by removing residual oil saturation out to as much as 45 feet in reservoirs where permeability to water is 10% of the absolute permeability.

Organic deposits such as paraffins and asphaltenes are present in some injection wells. Such deposits are usually never completely removed if the well was converted from a producer to an injection well. In addition, the initial injection of a relatively cold water into the matrix around the well bore can result in paraffin precipitation in some reservoirs. The magnitude of injectivity improvements obtained by dissolving organic deposits can, depending on the extent of damage resulting from skin formation, lead to several-fold increases in injectivity.

Some of the more important requirements for good water injection well cleanout fluids are as follows.

(1) They should be oil miscible in order to remove the organic skin usually present on the face of an injection well. Good oil miscibility also aids in improved removal of residual oil saturation in the vicinity of the well bore.

(2) Such compostions should have good temperature stability so that they can be used under a broad range of both ambient and reservoir temperatures.

(3) Injection well cleanout fluids should exhibit a good degree of miscibility with most crude oils.

(4) They should mix with water readily and exhibit a smooth transition from the micellar solution to a dilute aqueous solution.

(5) These fluids should possess a high tolerance for varying salt compositions so that the system can be adjusted readily to compensate for small variations in raw ingredients and for different types of make-up water.

BRIEF DESCRIPTION OF THE INVENTION

While the compositions of our invention are in some respects similar to those of the prior art, they differ in at least one important respect, i.e., the nature of the cosurfactant. These micellar solutions generally contain a common hydrocarbon solvent, a hydrocarbon sulfonate as the surfactant, a cosurfactant consisting essentially of a mixture of a 2–12 mol ethylene oxide adduct of a primary alcohol having from 4–10 carbon atoms and a $C_4$ to $C_6$ alcohol or a mixed alcohol stream such as fusel oil, and water.

The sulfonates employed in preparation of the novel compositions of our invention may be produced by the treatment of lube stock or similar mineral oils, first with sulfuric acid and then neutralizing with caustic or ammonium hydroxide. Such sulfonates are frequently referred to as petroleum mahogany sulfonates, the cationic portion of which may be any of the alkali metals or the ammonium ion. The corresponding divalent metal ion salts or the presence of excessive amounts of divalent metal ions in the system in which these solubilized solutions are used is undesirable. Likewise, the petroleum alkali metal sulfonates, when in a formation brine containing divalent metal ions, tend to create emulsion problems. The average molecular weight of these sulfonates ranges from about 425 to 575. They are predominantly oil-soluble and their solubility in water generally should not exceed about five weight percent. Typically, a commercial sulfonate composition useful in preparing the solutions of our invention has an average molecular weight of from about 430 to about 470, contains about 58–70% sodium petroleum sulfonate, 30–40% mineral oil, and 2–3% inorganic salt, all percentages being by weight. The corresponding ammonium sulfonates are likewise suitable.

The adduct employed is prepared, preferably, from 6 to 8 mols of ethylene oxide and 1 mol of 1-hexanol. The weight ratio of sulfonate (surfactant) to cosurfactant may vary from 2.5:1 to 10:1. For a smoother transition to water at the trailing edge of a dilute micellar solution, particularly in the case of low permeability rock, i.e., less than 20 md., the hydrocarbon may be omitted and the ratio of sulfonate to cosurfactant should be decreased to a level as low as 1:1. In the case of low water content fluids, i.e., not more than about 40%, such as those used in flooding operations or for promotion of better oil miscibility, the ratio of sulfonate to cosurfactant should be increased. With the cosurfactant the weight ratio of ethylene oxide adduct to preferably oil soluble alcohol may range from about 1:1 to about 9:1.

Any of the hydrocarbon components previously used in preparing micellar systems may be employed in the preparation of our novel compositions, including crude oil, kerosene, gas oil, diesel oil, gasoline, naphtha, and the like. For injection well cleanout jobs, the use of a lighter hydrocarbon such as kerosene, naphtha, etc., is preferred since micellar systems made with such hydrocarbons possess better water miscibility and hence the tendency to form an emulsion at or near the well bore face is materially reduced. Formation of emulsion in operations of this type is undesirable because they reduce substantially the permeability of the rock. The use of the heavier hydrocarbons is generally preferred where good oil miscibility is desired, such as in miscible flooding operations employing these micellar solutions as the solvent.

To aid in the formation of transparent, stable micellar solutions we have found it advantageous to employ inorganic salts such as the chlorides, sulfonates and nitrates of the alkali metals, for example, sodium chloride, sodium sulfate, potassium chloride, sodium nitrate, etc. The effect of the presence of such materials in micellar solutions on the stability of the latter will be discussed below. Generally we prefer to employ such salts in concentrations ranging from about 7000 to about 13,000 p.p.m.

DESCRIPTION OF A PREFERRED EMBODIMENT

In preparing the aforesaid compositions the concentration of ingredients may cover a wide range. For example, the hydrocarbon component may vary from zero to about 80 weight percent, sulfonate from about 1 to 40 weight percent, cosurfactant from about 0.1 to about 15 weight percent, and water from about 10 to about 95 weight percent. A typical example of the concentrate contemplated by our invention is as follows, all percentages are by weight.

|  | Percent |
| --- | --- |
| Kerosene | 65.1 |
| Sulfonate | 27.9 |
| Cosurfactant [1] | 7.0 |

[1] This concentrate when mixed with from about 10 to about 95 weight percent water is then suitable for use in either injection well cleanout or miscible flooding operations.

Another typical composition for water injection well cleanout may contain:

|  | Percent |
| --- | --- |
| Water | 50 |
| Kerosene | 32.5 |
| Sulfonate | 14 |
| Cosurfactant | 3.5 |

With such solvent slug a diluted buffer micellar slug may be injected into the formation before and after the solvent slug in accordance with the invention described and claimed in copending U.S. application Ser. No. 38,365, filed May 18, 1970, by Dwight L. Dauben et al.

As previously mentioned, the feature which renders the compositions of our invention outstandingly different from those of the prior art, and which permits flexibiilty in the variety of conditions under which these compositions can be used, is the cosurfactant employed. We have discovered that blends of the ethylene oxide-primary alcohol adduct and the $C_4$ to $C_6$ alcohols have a synergistic action on injectivity improvement fluids not exhibited by either of these types of cosurfactants by themselves. This observation is based on results we have obtained in tests during the combined and separate use of the 6 mol ethylene oxide adduct of 1-hexanol and fusel oil.

When the 6 mol ethylene oxide adduct of 1-hexanol is employed as the sole cosurfactant in micellar systems, clear solutions very often cannot be produced. When they are obtained, they exist normally only over a rather limited range of salinities in the water and at a high salt level. In addition to problems introduced by the narrow salt limits, water dilution of a micellar slug containing a large amount of salts leads to greater than normal emulsion formation. It is desirable to keep emulsion formation at the lowest possible level in order to prevent plugging of the rock.

When using fusel oil by itself as the only corsurfactant in a micellar system, we were unable to obtain clear solutions over a wide range of ingredient concentrations. On the other hand, where a blend of the 6 mol ethylene oxide adduct of 1-hexanol and fusel oil was used in the proper ratio, micellar solutions of the desired flexibility were obtained. Micellar solutions employing such a cosurfactant were found to exhibit stability over a wide range of water salinity. This property is desirable since addition of salts can be used to compensate for variations in component properties or inaccuracies in weight measurements. In addition, micellar solutions can be formulated with less total salts in the water. When the amount of the aforesaid adduct in the cosurfactant is increased, the temperature stability of the micellar solution is greater. The effect of fusel oil in the mixture is to promote oil miscibility and to lower the micellar solutions's viscosity.

FIG. 1 data points serving as the basis for the plots appearing therein were obtained under controlled conditions. Initially the micellar solution concentrate consisting of kerosene, sulfonate and the cosurfactant of our invention was mixed with an equal volume of water. Thereafter the system was changed by varying the salt content and the volume ratio of the adduct to fusel oil. Solutions considered most acceptable are transparent. Emulsified solutions are not acceptable because of their extremely high viscosity. Hazy solutions, although low in viscosity, generally separate with time into two layers. Both the amount and type of salt greatly affect micellar solution properties, some of which are shown in the accompanying drawing. It will be seen that transparent solutions are formed within certain limits of salinities. At low salt levels, typically under 6000 p.p.m., solutions are often clear but viscous, hazy or emulsified. The preferred transparent solutions typically occur within salt ranges between 6000 to 15,000 p.p.m. and at volume ratios of the adduct to fusel oil of from about 3:1 to about 8:1. Micellar solutions utilizing water at the lower end of the salinity range are preferred as such solutions grade more smoothly when mixed with the drive water used either in miscible flooding or for injection well cleanout. Emulsified solutions typically exist when water salinities exceed a value in the range of 15,000 to 20,000 p.p.m. The desired salt levels of water in buffer slugs employed in the injection well cleanout process is less than that used in the primary solvent slug. The experimental data indicate that the salt levels required to achieve transparent high water solutions decrease linearly as the water content is increased.

Figure 2:
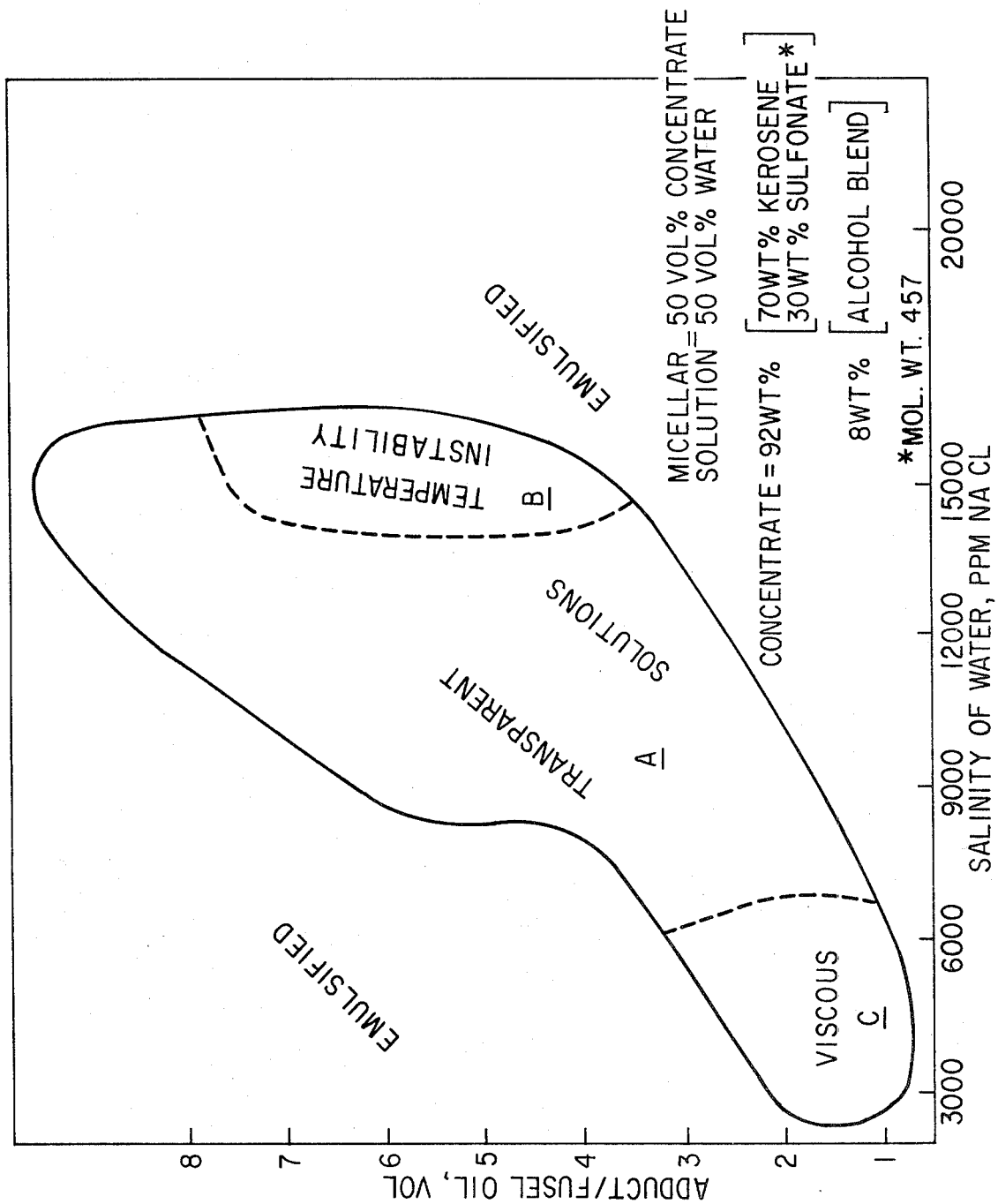

In FIG. 2 the data forming the basis for the plot therein were obtained in essentially the same manner as described immediately above. However, as will be noted the composition of the concentrate was somewhat different from that shown in FIG. 1 in that the former contained more cosurfactant and sulfonate. This plot demonstrates the effect of increased concentrations of both surfactant and cosurfactant on solution properties. Thus, with the system shown in FIG. 2 it is possible to obtain clear solutions over a greater range of adduct-fusel oil volume ratios than was possible in the case of FIG. 1. The compositions constituting the clear solutions are found in the relatively large area designated A. Also, it will be seen that as the salt content of the system is increased, e.g., from about 14,000 to 15,000 p.p.m., and at the higher volume ratios of adduct to fusel oil, solutions are produced that have a low temperature stability, e.g., the solution either forms two layers or emulsifies at temperatures ranging from about 75° to about 160° F. In this connection, note the area designated B. Likewise, at the lower salinities and low adduct-fusel oil volume ratios, the solutions become more viscous (area C) and are generally unsatisfactory.

Figure 3:
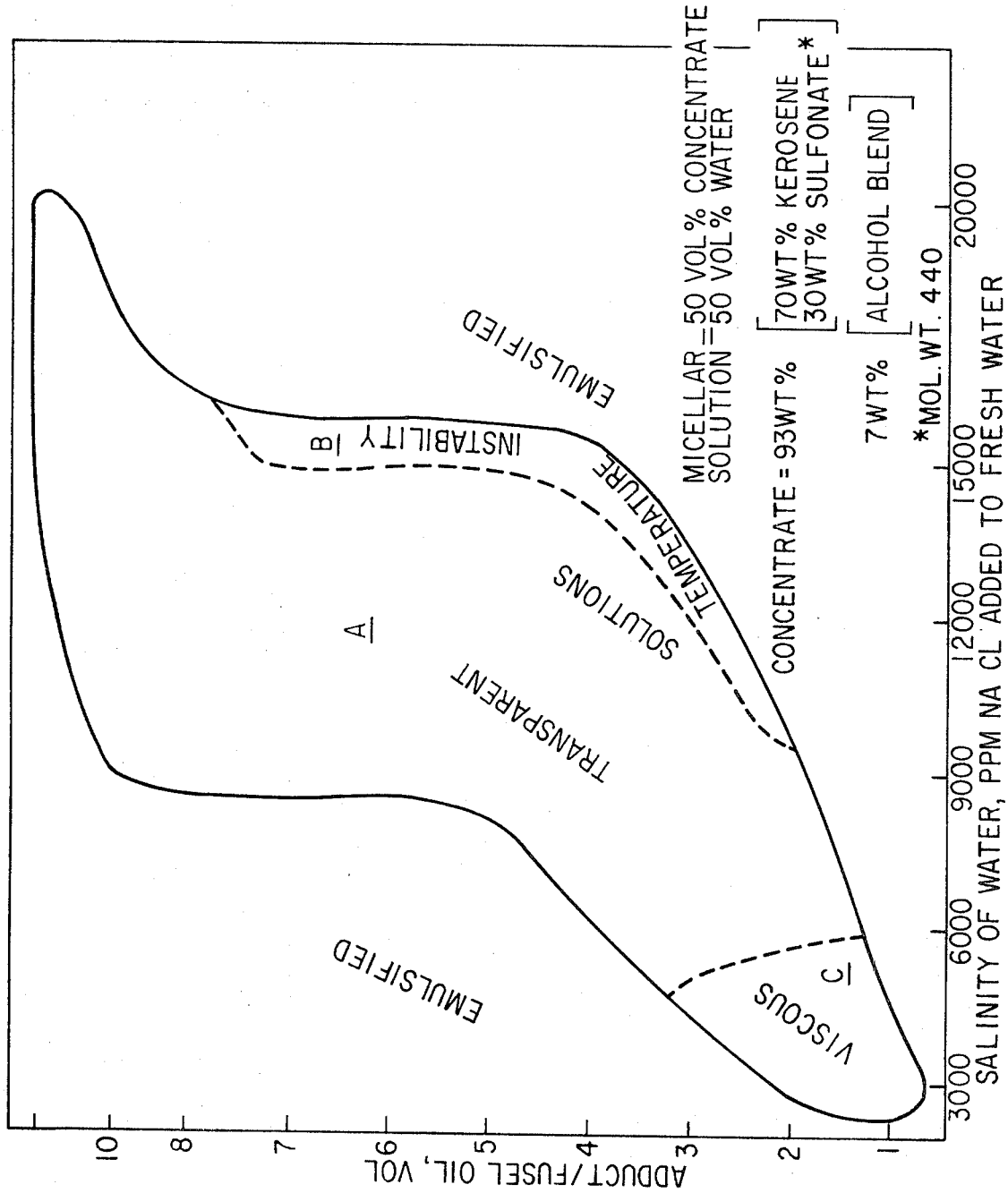

FIG. 3 represents still another composition of the micellar solutions coming within the scope of our invention. It will be noted that the particular concentrate employed was identical with that disclosed in column 3, lines 35 thru 63 hereof. In obtaining the data forming the basis of the plot shown it will be seen that the amount of cosurfactant used is intermediate that employed in the systems plotted in FIGS. 1 and 2. The areas denoting the temperature unstable and viscous compositions, designated as B and C, respectively, are roughly the same in area as shown in FIG. 2. However, area A, indicating the transparent and useful composition, is substantially greater than similar areas in FIGS. 1 and 2. One feature unique to FIG. 3, however, is that the temperature unstable area runs in a narrow region from a low adduct to fusel oil ratio and a salt content of about 9000 p.p.m. to a relatively high ratio of adduct to fusel oil and a salt content slightly in excess of 15,000 p.p.m.

In FIG. 4, six separate systems were prepared containing 50 volume percent concentrate and the balance aqueous brine. In some cases the composition of the concentrate was changed while in the others the nature of the brine was altered. The exact salt concentration of the brine used in a given system can be determined from the bar chart at the top of FIG. 4. The composition of each of the systems tested is noted below.

Case 1

50 vol. percent concentrate composed of: 69 weight percent kerosene, 26 weight percent petroleum mahogany sulfonate, 3.8 weight percent 6 mol ethylene oxide adduct of 1-hexanol, 1.2 weight percent iso-butyl alcohol
50 vol. percent distilled water containing added sodium chloride Case 2

50 vol. percent concentrate composed of: 65 weight percent kerosene, 28 weight percent petroleum mahogany sulfonate, 6.2 weight percent 6 mol ethylene oxide adduct of 1-hexanol, 0.8 weight percent fusel oil
50 vol. percent distilled water containing added potassium chloride Case 3

50 vol. percent concentrate composed of: 65 weight percent kerosene, 28 weight percent petroleum mahogany sulfonate, 6.2 weight percent 6 mol ethylene oxide adduct of 1-hexanol, 0.8 weight percent fusel oil
50 vol. percent distilled water containing added lithium chloride Case 4

50 vol. percent concentrate composed of: 65 weight percent Stoddard solvent,[1] 28 weight percent petroleum mahogany sulfonate, 6.2 weight percent 6 mol ethylene oxide adduct of 1-hexanol, 0.8 weight percent fusel oil
50 vol. percent distilled water containing added sodium chloride Case 5

50 vol. percent concentrate composed of: 65 weight per-

---
[1] A petroleum distillate having a flash point not lower than 100° F. At least 50% of its components boil at or below 350° F., and the dry end point is not higher than 410° F.

cent kerosene, 28 weight percent petroleum mahogany sulfonate, 3.5 weight percent 10 mol ethylene oxide adduct of 1-hexanol, 3.5 weight percent fusel oil
50 vol. percent distilled water containing added sodium chloride Case 6

50 vol. percent concentrate composed of: 65 weight percent kerosene, 28 weight percent petroleum mahogany sulfonate, 7 weight percent fusel oil
50 vol. percent distilled water containing added sodium chloride From an inspection of FIG. 4 it will be seen that the synergistic action of the cosurfactant combination taught herein is produced with different kinds of salts, salt concentrations, different degrees of ethoxylation of primary alcohol adduct, different types of hydrocarbons and with different $C_4$–$C_6$ alcohol components. In this connection it can be seen from FIGS. 1, 2 and 3 that in mixtures employing only an ethoxylated hexanol as the cosurfactant, hazy, emulsified systems were produced.

In the data appearing in FIGS. 1, 2 and 3, the cosurfactant—designated alcohol blend—was a mixture of the 6 mol ethylene oxide adduct of 1-hexanol and fusel oil.

We claim:

1. A transparent micellar solution having an inorganic alkali metal salt concentration ranging from about 6000 to about 15,000 p.p.m., from about 1 to about 40 weight percent of a petroleum sulfonate having an average molecular weight ranging from about 425 to about 575, said sulfonate being selected from the group consisting of alkali metal and ammonium sulfonates, up to about 80 weight percent of a hydrocarbon oil, from 0.1 to about 15 weight percent of a cosurfactant consisting essentially of a mixture of a 2–12 mol ethylene oxide adduct of 1-hexanol and a $C_4$ to $C_6$ unsubstituted monohydric alcohol component.

2. The micellar solution of claim 1 in which the weight ratio of sulfonate to cosurfactant ranges from about 2.5:1 to about 10:1 and the weight ratio of the ethylene oxide adduct to said unsubstituted alcohol is from about 1:1 to about 9:1.

3. The micellar solution of claim 1 wherein the alcohol component employed with the aforesaid adduct is fusel oil.

4. The micellar solution of claim 1 wherein the cosurfactant employed consists essentially of a mixture of 6–8 mol ethylene oxide adduct of 1-hexanol and the alcohol component is fuel oil.

5. The micellar solution of claim 4 wherein a $C_5$ alcohol is employed in place of fusel oil.

6. A micellar solution consisting essentially of an alkali metal petroleum sulfonate, a cosurfactant of a 6 mol ethylene oxide adduct of 1-hexanol and fusel oil, and kerosine, said solution having the composition defined by a point lying within the area designated as "A" in FIG. 1 of the drawings.

7. A micellar solution consisting essentially of an alkali metal petroleum sulfonate, a cosurfactant of a 6 mol ethylene oxide adduct of 1-hexanol and fusel oil, and kerosine, said solution having the composition defined by a point lying within the area designated as A in FIG. 2 of the drawings.

8. The micellar solution of claim 4 wherein the ratio of said adduct to said alcohol component ranges from about 3:1 to about 8:1.

9. The micellar solution of claim 4 wherein the ratio of surfactant to cosurfactant ranges from about 1:1 to about 10:1.

10. A micellar solution consisting essentially of an alkali metal petroleum sulfonate, a cosurfactant of a 6 mol ethylene oxide adduct of 1-hexanol and fusel oil, and kerosine, said solution having the composition defined by a point lying within the area designated as A in FIG. 3 of the drawings.

References Cited
UNITED STATES PATENTS

| | | | |
|---|---|---|---|
| 3,268,447 | 8/1966 | Dickey et al. | 252—49.5 X |
| 3,508,611 | 4/1970 | Davis et al. | 252—8.55 X |
| 3,117,929 | 1/1964 | McCoy et al. | 252—49.5 |
| 3,236,303 | 2/1966 | Csaszar | 166—274 |
| 3,474,865 | 10/1969 | Gogarty et al. | 166—274 |

HERBERT B. GUYNN, Primary Examiner

U.S. Cl. X.R.

166—273, 274; 252—308, 309